United States Patent [19]

Payoux

[11] 4,089,385
[45] May 16, 1978

[54] DEVICE FOR BINDING AN ENGINE TO A VEHICLE CHASSIS OR BODY

[75] Inventor: Daniel Payoux, Boulogne-Billancourt, France

[73] Assignee: Regie Nationale des Usines Renault, Boulogne-Billancourt, France

[21] Appl. No.: 744,777

[22] Filed: Nov. 24, 1976

[30] Foreign Application Priority Data

Nov. 27, 1975 France .................................. 75 36341

[51] Int. Cl.² ............................................ B60G 13/00
[52] U.S. Cl. ..................................... 180/64 R; 248/9
[58] Field of Search ................. 180/64 R; 248/5, 8, 248/9, 15; 280/106.5 R; 267/33, 35

[56] References Cited

U.S. PATENT DOCUMENTS

| 3,326,501 | 6/1967 | Cauvin | 180/64 R X |
| 3,851,722 | 12/1974 | Grosseau | 180/64 R X |
| 3,894,604 | 7/1975 | Grosseau | 180/64 R |
| 3,970,162 | 7/1976 | Salver | 180/64 R |

Primary Examiner—Joseph F. Peters, Jr.
Assistant Examiner—Gene A. Church
Attorney, Agent, or Firm—Fleit & Jacobson

[57] ABSTRACT

Binding device for connecting a transverse-mounted power unit to the body, chassis or like structure of a motor vehicle comprising in one of the anchoring systems a retaining member, for instance a cable, having a negligible rigidity, except when tensile efforts are applied thereto, and the opposite end of said retaining member is rigid with the other anchoring system, in order to limit the angular movements of the power unit.

7 Claims, 4 Drawing Figures

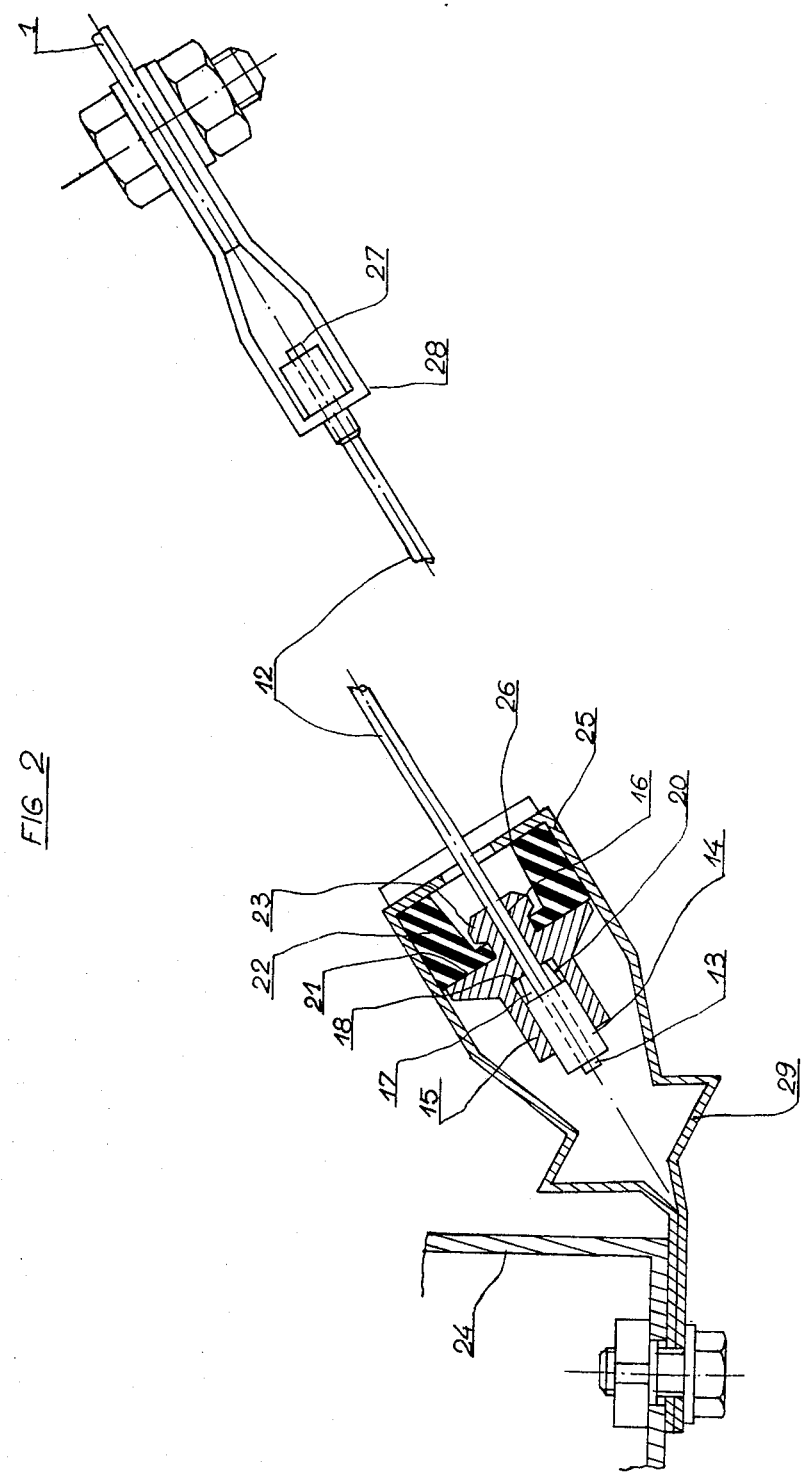

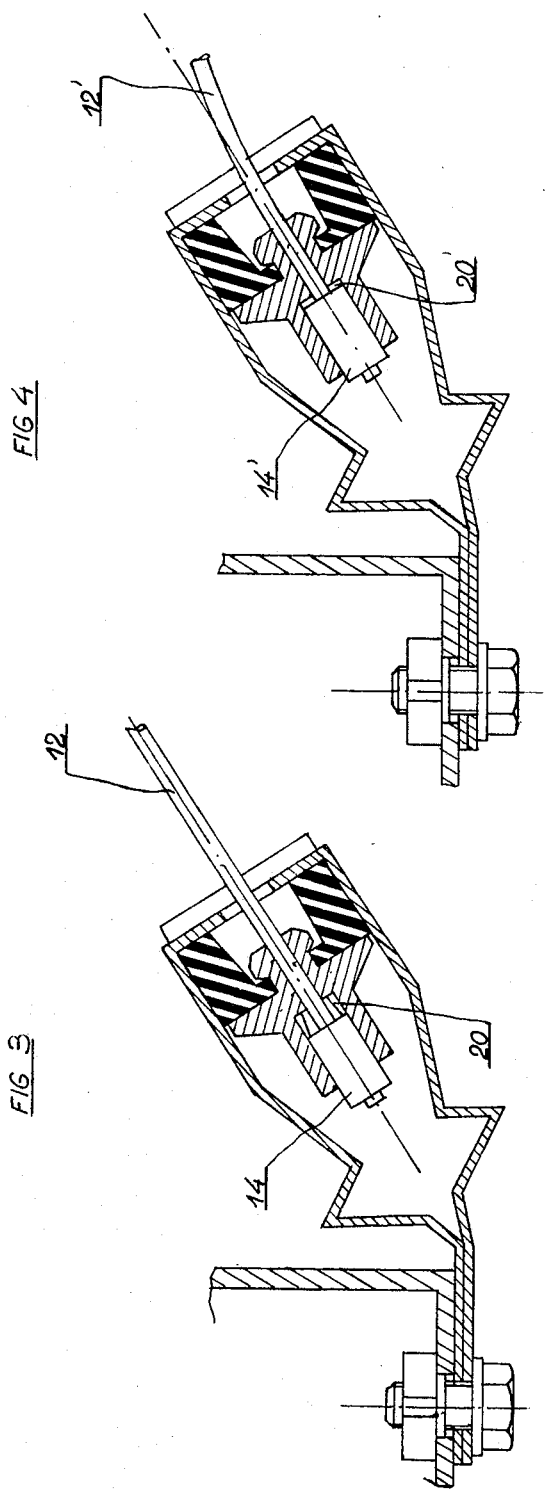

DEVICE FOR BINDING AN ENGINE TO A VEHICLE CHASSIS OR BODY

The present invention relates to means for binding or attaching an engine to the chassis or body of a vehicle, and more particularly to a binding device applied to a power unit disposed transversely in relation to the longitudinal median line of the vehicle.

It is the principal object of this invention to provide a longitudinally self-adjustable binding device attached to the engine or power unit and to the vehicle chassis or body, respectively. In the following disclosure, the term "chassis" designates any element of the frame structure or even of the body of the vehicle, and the term "engine" designates indifferently the engine proper or the complete power unit of said vehicle.

Another object of this invention consists of providing a binding device fixed to the engine and to the chassis of the vehicle, in order to restrict the permissible angular movements of the engine in relation to said chassis, notably when starting the vehicle from rest or during the acceleration thereof, for the purpose of avoiding any abnormal fatigue and compressive strain of the suspension members interposed between the engine and the chassis.

Furthermore, this invention is concerned with a binding device solid with the engine and the chassis of the vehicle, respectively, wherein the two anchoring systems to said engine and said chassis, respectively, are free of any strain when the engine speed or the relative velocity of the vehicle are stabilized.

In addition, this invention is directed to provide a novel device for binding an engine to the chassis of a motor vehicle, this device being designed to permit the free inertia movements of the engine during brake applications or in case of front cash, this device being oriented substantially in the longitudinal direction of the vehicle.

According to this invention, the first anchoring system comprises means ensuring the self-adjustment of the length of the binding device, said means being attached to the first end of a retaining member having a negligible rigidity under compressive and flexion stresses, while the other end of said retaining member is attached to the second anchoring system. In the device thus obtained the first end of the retaining member co-operates with the self-adjustment means as a consequence of a relative movement of said anchoring systems in the direction of their movement away from each other during the angular inertia movement of the engine when the vehicle is started from rest. According to a preferred form of embodiment of the device, the self-adjustment means consist of deformable ribs having their ends in engagement with an end piece secured to one end of a cable, a metal strip or a belt or webbing.

The device is adjusted automatically during actual service during the partial squeezing of the ribs while the retaining member is stretched by the efforts resulting from the engine movement due to the starting torque of the vehicle. Thus, the amplitude of the engine angular movements is limited by the breaking stress and strength of the retaining member.

On the other hand, when the engine operates under stabilized speed conditions, the anchoring systems of the device are not subjected to fatique strains for the engine, in this case, accomplishes only low-amplitude movements.

In case of front crash between the vehicle and an obstacle, it is clear that the engine can tip freely forwards due to the extremely low stiffness of the device of which one of the anchoring systems will advantageously be fastened to one element of the front structure of the vehicle, for example a cross member interconnecting the longitudinal side members. Therefore, the distance between the passengers and the engine can increase when the anchorage means of the power unit have been torn off as a consequence of the power unit movement. Consequently, the life-saving space available for the occupants of the vehicle is increased appreciably.

Other features and advantages of this device will appear as the following description proceeds with reference to the attached drawing, in which:

FIG. 2 is a part-sectional view showing the device of this invention on a larger scale, and FIGS. 3 and 4 are other fragmentary views showing the condition of the self-adjusting means of the device in its freshly mounted position and subsequent to the operation thereof, respectively.

Figure 1:
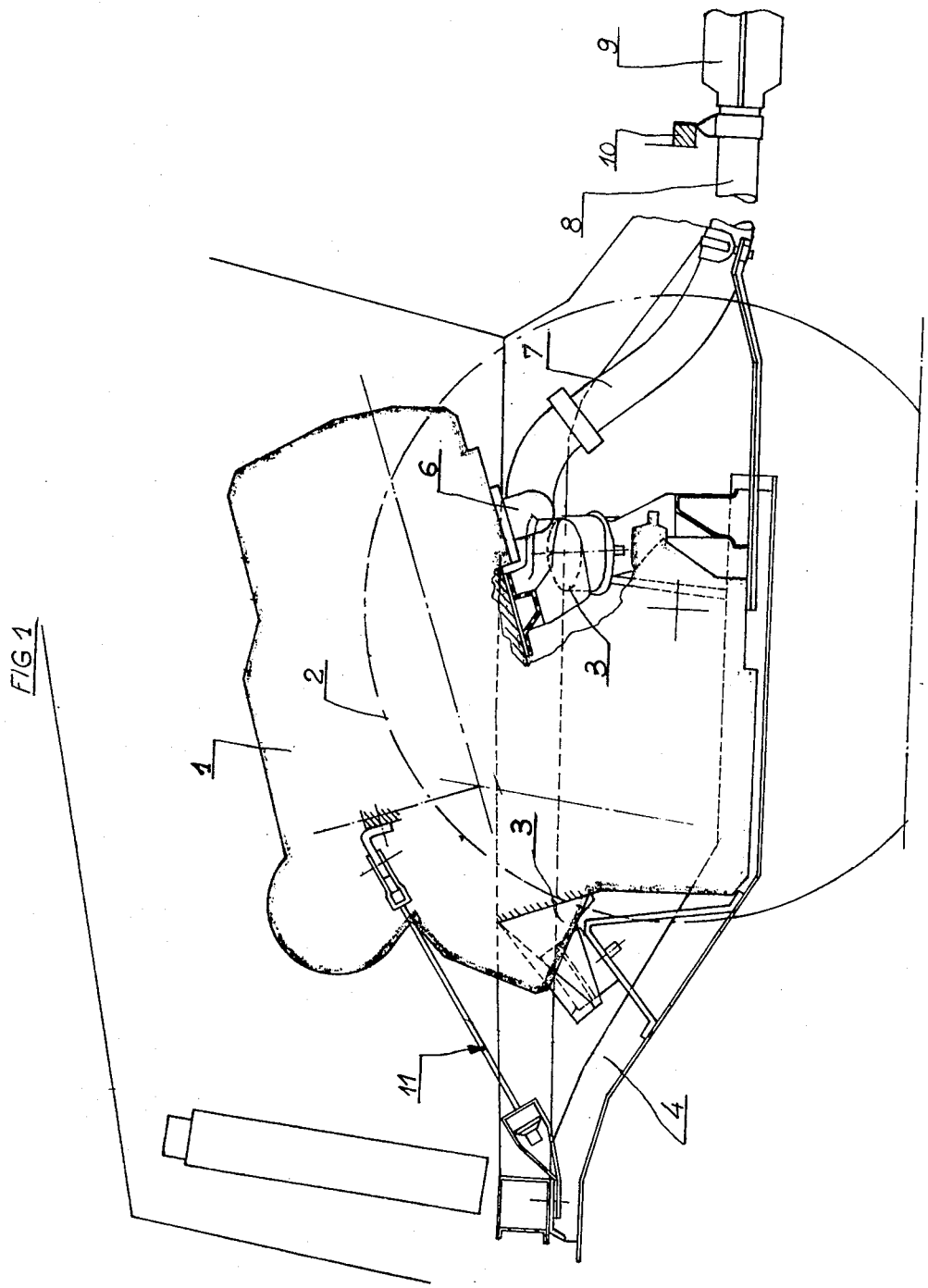
FIG. 1 is a diagrammatic elevational view of the power unit disposed on the chassis of a vehicle.

In the arrangement illustrated in FIG. 1, the power unit 1 drives the front drive wheels 2 of the vehicle and is disposed transversely to the longitudinal center line of the vehicle. The power unit 1 is anchored to the bottom structure or chassis 4 of the vehicle by means of resilient connecting and suspension members 3.

The front wheels 2 are suspended independently of each other from the bottom 4 of the vehicle. An exhaust pipe 6 rigid with the engine 1 comprises a first section 7 rigidly secured to the power unit and another section 8 connected to the exhaust gas expansion receptacle or muffler 9.

Resilient connecting and suspension members 10 are provided between the exhaust pipe section 8 and the chassis structure 4. In order to keep the fatigue and compressive stress of the resilient connection and suspension members 3 within reasonable limits, during angular inertia movements of the power unit as when starting same, or during its acceleration or alternatively in case of irregular engine operation (throbbing), a binding device 11 to be described hereinafter in detail with reference to FIGS. 2 and 4 of the drawings is provided.

This binding device 11 comprises a retaining member 12 having a negligible compression and flexion rigidity but a high tensile rigidity. One section of a cable, wire, a metal strap or a textile webbing or strip may be used for constituting this retaining member.

The first end 13 of retaining member 12 (consisting in this example of a cable section) carries a set or welded end piece 14 fitted in the cavity of a retaining cup 15 made for example of acetal resin. This cup 15 has formed through its bottom an axial hole 16 for the cable section 12 which opens into another cavity 17 formed with a bottom 18 and containing the self-adjustment means. These self-adjusting means comprise said end-piece 14 and a set of deformable ribs 20 housed in said cavity 17 and inclined to the axis so as to converge towards said passage hole 16.

The cup 15 engages with its outflared base 21 the registering surface of a damping pad 22 also formed with a through axial hole engaged by said cable section 12. Furthermore, the cup 15 is assembled with the pad 22 by means of a mushroom-shaped portion 23 thereof projecting into an inner cavity formed in said pad 22, as shown.

The assembly comprising the cup 15, pad 22 and end portion 13 of cable 12 is rigidly connected to a cross member 24 of the chassis by means of a first anchoring system comprising a sheet-metal strap 25 having a hole formed centrally of its end face 26 for the passage of cable 12, this strap 25 supporting the cup 15 and pad 22. The opposite end 27 of cable section 12 is rigid with a second anchoring system comprising an anchor lug 28 fastened to the power unit 1.

The length of said cable 12 in relation to the pair of anchoring systems 25, 28 is adjusted automatically as a consequence of a certain squeezing of ribs 20 by the end piece 14 when the power unit is operating and exerts a tensile effort on cable 12. From the initial mounting configuration of the self-adjusting means illustrated in FIG. 3, the modified configuration illustrated in FIG. 4 is obtained after operating the engine, the initial components 12, 14 and 20 assuming the positions and shapes illustrated at 12', 14' and 20', respectively, in FIG. 4.

More particularly, as a consequence of the stresses caused by the movement of the power unit, and due to the starting torque of the vehicle and also to an irregular engine operation, the cable section 12 is tensioned and the damping pad 22 acts as a filter to the various vibrations so that these are not transmitted to the strap 25 and consequently to the chassis cross member 24. It is clear that this arrangement will preserve the exhaust pipe system from flexion stresses possibly transmitted through the power unit. When said stresses are not present, the traction cable 12 is slackened as a consequence of its low compression and flexion rigidity, and the anchoring systems 25, 28 are not exposed to any fatigue stress. The same applies also in case of crash between the vehicle and a fixed obstacle. In this case, the power unit tends to move forwards by inertia, without having to overcome any appreciable resistance; on the other hand, its backward movement is limited as explained in the foregoing by the tension of cable 12.

Of course, it would not constitute a departure from the basic principles of the invention to associate additional or complementary energy absorbing means with the above-described device, this means being integrated for example in the anchoring systems 25 and/or 28.

In fact, it is only necesary that at least one of the arms of strap 25 carries one or a plurality of deformable pleats 29 adapted to permit a certain extension of said strap beyond a predetermined threshold of intensity of the tensile effort exerted on cable 12. As a rule, this predetermined intensity threshold will be higher than the force necessary for squeezing the ribs 20 (i.e. the effort necessary for obtaining the self-adjustment feature) and lower than the breaking strength of cable 12.

What is claimed is:

1. Device for binding a power unit resiliently connected to a chassis of a vehicle, the device being interposed between two anchoring systems rigid with said power unit and said chassis, respectively, wherein one of said anchoring systems carries means for self-adjusting the length of the binding device, said means being fastened to one end of a retaining member having a negligible compression and flexion rigidity, the opposite end of said retaining member being fastened to the other anchoring system.

2. Device according to claim 1, wherein said self-adjusting means associated with said one of said anchoring systems comprises a set of deformable ribs formed on a retaining cup engaging an end piece secured to one end of a cable section constituting the aforesaid retaining member.

3. Device according to claim 2, wherein said retaining cup engages a damping pad and that said cable section extends through said cup and said damping pad.

4. Device according to claim 3, wherein said retaining cup and said damping pad bear against the bottom of a strap secured to a cross member of the vehicle chassis.

5. Device according to claim 1, wherein an energy absorbing device is associated with at least one anchoring system of the binding device.

6. Device according to claim 5, wherein the energy absorbing device associated with said one anchoring system has a threshold of operation higher than the effort necessary for selfadjusting the length of the binding means and lower than the tensile strength of the retaining means.

7. A device for use with a vehicle having a power unit resiliently connected to first portions of the vehicle, the device including retaining means adapted to resiliently bind the power unit to the vehicle, the device comprising:

a first anchoring system rigidly connected to said power unit;

a second anchoring system rigidly connected to a second portion of said vehicle; and retaining means, including a member having negligible compression and flexion rigidity, interconnected between said first and said second anchoring systems, one of said first and said second anchoring systems including self-adjusting means operatively associated with one end of said member for increasing the length of said retaining means when a force above a predetermined level is applied by the power unit to said retaining means.

* * * * *